United States Patent
Ye et al.

(10) Patent No.: US 12,402,162 B2
(45) Date of Patent: Aug. 26, 2025

(54) UTILIZATION OF INTER-UE COORDINATION MESSAGE

(71) Applicant: Apple Inc., Cupertino, CA (US)

(72) Inventors: Chunxuan Ye, San Diego, CA (US); Wei Zeng, San Diego, CA (US); Dawei Zhang, Saratoga, CA (US); Hong He, Cupertino, CA (US); Haitong Sun, Irvine, CA (US); Weidong Yang, San Diego, CA (US); Oghenekome Oteri, San Diego, CA (US); Sigen Ye, Whitehouse Station, NJ (US); Chunhai Yao, Beijing (CN); Yushu Zhang, Beijing (CN); Huaning Niu, San Jose, CA (US); Jia Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 541 days.

(21) Appl. No.: 17/438,977

(22) PCT Filed: Oct. 15, 2020

(86) PCT No.: PCT/CN2020/121119
§ 371 (c)(1),
(2) Date: Sep. 14, 2021

(87) PCT Pub. No.: WO2022/077329
PCT Pub. Date: Apr. 21, 2022

(65) Prior Publication Data
US 2022/0322360 A1 Oct. 6, 2022

(51) Int. Cl.
*H04W 72/563* (2023.01)
*H04W 72/20* (2023.01)
(Continued)

(52) U.S. Cl.
CPC ........ *H04W 72/563* (2023.01); *H04W 72/20* (2023.01); *H04W 76/14* (2018.02); *H04W 92/18* (2013.01)

(58) Field of Classification Search
CPC ... H04W 72/563; H04W 76/14; H04W 72/20; H04W 92/18
(Continued)

(56) References Cited

U.S. PATENT DOCUMENTS

2012/0250644 A1* 10/2012 Sambhwani .......... H04W 72/21
370/328
2014/0280437 A1* 9/2014 Eder ...................... H04L 67/10
709/201

(Continued)

FOREIGN PATENT DOCUMENTS

| CA | 2985543 A1 | 11/2016 |
|---|---|---|
| CN | 110999460 | 8/2017 |

(Continued)

OTHER PUBLICATIONS

Extended European Search Report for EP Patent Application No. 20957108.2; Sep. 21, 2023.
(Continued)

*Primary Examiner* — Hermon Asres
(74) *Attorney, Agent, or Firm* — Kowert, Hood, Munyon, Rankin & Goetzel, P.C.

(57) ABSTRACT

Apparatuses, systems, and methods for utilization of an inter-UE coordination message. A UE may receive, from a first UE, an inter-UE coordination message. The inter-UE coordination message may include an indication of a set of resources and an indication of whether the set of resources are preferred resources or non-preferred resources. The UE may be configured to select resources for sidelink communications based on the set of resources indicated in the (Continued)

inter-UE coordination message. The UE may perform differing selection processes based on the set of resources indicated in the inter-UE coordination message. The UE may perform a first process and/or set of processes when the set of resources are indicated as non-preferred and a second process and/or set of processes when the set of resources are indicated as preferred.

20 Claims, 9 Drawing Sheets

(51) Int. Cl.
*H04W 76/14* (2018.01)
*H04W 92/18* (2009.01)
(58) Field of Classification Search
USPC .......................................................... 370/329
See application file for complete search history.

(56) References Cited

U.S. PATENT DOCUMENTS

2020/0169984 A1  5/2020 Lee
2022/0361213 A1* 11/2022 Hosseini ............... H04L 5/0098

FOREIGN PATENT DOCUMENTS

| CN | 110447294 | | 11/2019 |
|---|---|---|---|
| CN | 110876202 | | 3/2020 |
| CN | 110972290 | A | 4/2020 |
| CN | 110999516 | | 4/2020 |
| CN | 111083785 | A | 4/2020 |
| CN | 111565373 | | 8/2020 |
| JP | 2019525647 | | 9/2019 |
| WO | 2018202798 | A1 | 11/2018 |
| WO | 2020019871 | | 1/2020 |
| WO | WO 2020/028662 | * | 2/2020 |

OTHER PUBLICATIONS

Huawei et al. "Inter-UE coordination in sidelink resource allocation"; 3GPP TSG RAN WG1 Meeting #102-e R1-2005255; Aug. 17, 2020.
International Search Report for PCT Patent Application No. PCT/CN2020/121119; mailed Jul. 20, 2021.
TCL Communication "Feasibility and Benefits for Mode 2 enhancements"; 3GPP TSG RAN WG1 #102-e, R1-20005774; Aug. 17-28, 2020.
Office Action for JP Patent Application No. 2023-522562; Feb. 5, 2024.
Huawei et al. "UE autonomous resource selection based on sensing"; 3GPP TSG RAN WG2 Meeting #95 R2-164878; Aug. 22, 2016.
Office Action for CN Patent Application No. 202080106266.8; Jul. 30, 2024.
Notice of Grant for CN 202080106266.8; Feb. 7, 2025.
Notice of Allowance for JP 2024-101373; Jun. 16, 2025.
Ericsson "Feasibility and benefits of mode 2 enhancements for inter-UE coordination" 3GPP TSG RAN WG1 #102-e R1-2006445; Aug. 17, 2020.

* cited by examiner

UTILIZATION OF INTER-UE COORDINATION MESSAGE

PRIORITY CLAIM INFORMATION

This application is a national stage application of International Application No. PCT/CN2020/121119, filed on Oct. 15, 2020, titled "Utilization of Inter-UE Coordination Message", which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The invention relates to wireless communications, and more particularly to apparatuses, systems, and methods for utilization of an inter-UE coordination message, e.g., for V2X Mode 2 resource allocation.

DESCRIPTION OF THE RELATED ART

Wireless communication systems are rapidly growing in usage. One proposed use of wireless communications is in vehicular applications, particularly in V2X (vehicle-to-everything) systems. V2X systems allow for communication between vehicles (e.g., via communications devices housed in or otherwise carried by vehicles), pedestrian UEs (including UEs carried by other persons such as cyclists, and so forth), and other wireless communications devices for various purposes, such as to coordinate traffic activity, facilitate autonomous driving, and perform collision avoidance.

The increased communication requirements of certain V2X systems may strain the power and resource capabilities of portable, battery-powered UE devices. In addition, some UEs are more power limited than others and communicating with a host of UEs may present decreased battery life, increased latency, and degraded communication issues. Accordingly, improvements in the field would be desirable.

SUMMARY

Embodiments relate to wireless communications, including apparatuses, systems, and methods for utilization of an inter-UE coordination message, e.g., for V2X Mode 2 resource allocation.

For example, in some embodiments, a user equipment device (UE), such as UE 106, may be configured to receive, from a first UE, an inter-UE coordination message. The inter-UE coordination message may include an indication of a set of resources and an indication of whether the set of resources are preferred resources or non-preferred resources. The UE may be configured to select resources for sidelink communications based on the set of resources indicated in the inter-UE coordination message. In other words, the UE may perform differing selection processes based on the set of resources indicated in the inter-UE coordination message. For example, the UE may perform a first process and/or set of processes when the set of resources are indicated as non-preferred. In contrast, the UE may perform a second process and/or set of processes when the set of resources are indicated as preferred.

As an example, in some embodiments, the UE may be configured to determine resources available for sidelink communication and, when the set of resources are indicated as non-preferred (e.g., via the inter-UE coordination message), exclude at least a portion of the set of resources from the determined resources available for sidelink communication to generate a candidate resource set. As another example, in some embodiments, the UE may be configured to determine resources available for sidelink communication and, when the set of resources are indicated as preferred (e.g., via the inter-UE coordination message), determine an interaction set of resources based on a comparison of the resources available for sidelink communication and the set of resources.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
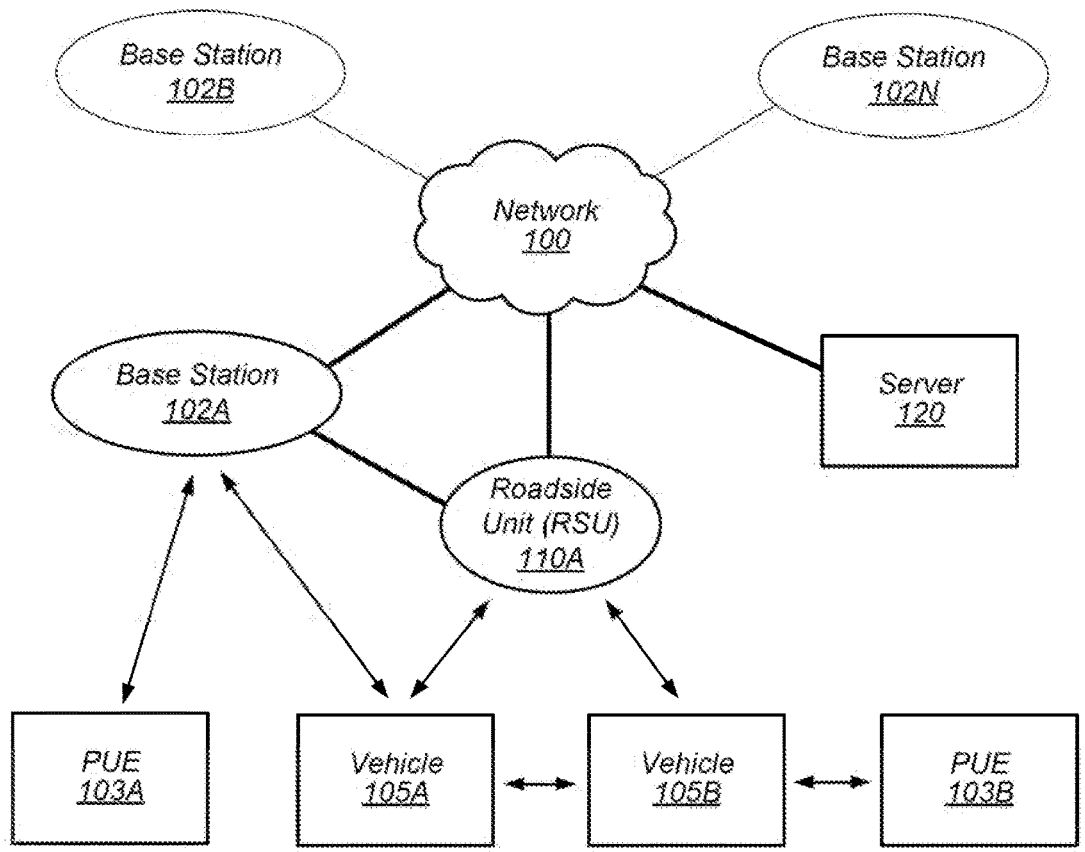
FIG. 1 illustrates an example vehicle-to-everything (V2X) communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
RRC: Radio Resource Control

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, and so forth; a non-volatile memory such as a Flash, magnetic media, e.g., a hard drive, or optical storage; registers, or other similar types of memory elements, and so forth. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Device—as used herein, may refer generally in the context of V2X systems to devices that are associated with mobile actors or traffic participants in a V2X system, e.g., mobile (able-to-move) communication devices such as vehicles and pedestrian user equipment (PUE) devices, as opposed to infrastructure devices, such as base stations, roadside units (RSUs), and servers.

Infrastructure Device—as used herein, may refer generally in the context of V2X systems to certain devices in a V2X system that are not user devices, and are not carried by traffic actors (e.g., pedestrians, vehicles, or other mobile users), but rather that facilitate user devices' participation in the V2X network. Infrastructure devices include base stations and roadside units (RSUs).

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Pedestrian UE (PUE) Device—a user equipment (UE) device as regarded in the context of V2X systems that may be worn or carried by various persons, including not only pedestrians in the strict sense of persons walking near roads, but also certain other peripheral or minor participants, or potential participants, in a traffic environment. These include stationary persons, persons not on vehicles who may not necessarily be near traffic or roads, persons jogging, running, skating, and so on, or persons on vehicles that may not substantially bolster the UE's power capabilities, such as bicycles, scooters, or certain motor vehicles.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, and so forth). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, and so forth.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, and so forth), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, and so forth) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112 (f) interpretation for that component.

FIG. 1: V2X Communication System

FIG. 1 illustrates an example vehicle-to-everything (V2X) communication system, according to some embodiments. It is noted that the system of FIG. 1 is merely one example of a possible system, and that features of this disclosure may be implemented in any of various systems, as desired.

Vehicle-to-everything (V2X) communication systems may be characterized as networks in which vehicles, UEs, and/or other devices and network entities exchange communications in order to coordinate traffic activity, among other possible purposes. V2X communications include communications conveyed between a vehicle (e.g., a wireless device or communication device constituting part of the vehicle, or contained in or otherwise carried along by the vehicle, including a UE) and various other devices. V2X communications include vehicle-to-pedestrian (V2P), vehicle-to-infrastructure (V2I), vehicle-to-network (V2N), and vehicle-to-vehicle (V2V) communications, as well as communications between vehicles and other possible network entities or devices. V2X communications may also refer to communications between other non-vehicle devices participating in a V2X network for the purpose of sharing V2X-related information.

V2X communications may, for example, adhere to 3GPP Cellular V2X (C-V2X) specifications, or to one or more other or subsequent standards whereby vehicles and other devices and network entities may communicate. V2X communications may utilize both long-range (e.g., cellular) communications as well as short-to medium-range (e.g., non-cellular) communications. Cellular-capable V2X communications may be called Cellular V2X (C-V2X) communications. C-V2X systems may use various cellular radio access technologies (RATs), such as 4G LTE or 5G NR RATs. Certain LTE standards usable in V2X systems may be called LTE-Vehicle (LTE-V) standards.

As shown, the example V2X system includes a number of user devices. As used herein, in the context of V2X systems, and as defined above, the term "user devices" may refer generally to devices that are associated with mobile actors or traffic participants in the V2X system, e.g., mobile (able-to-move) communication devices such as vehicles and pedestrian user equipment (PUE) devices. User devices in the example V2X system include the PUEs 103A and 103B and the vehicles 105A and 105B. Note that in various embodiments, the PUEs 103A and 103B and/or the vehicles 105A and 105B may each be a UE 106, e.g., as further described herein.

The vehicles 105 may constitute various types of vehicles. For example, the vehicle 105A may be a road vehicle or automobile, a mass transit vehicle, or another type of vehicle. The vehicles 105 may conduct wireless communications by various means. For example, the vehicle 105A may include communications equipment as part of the vehicle or housed in the vehicle, or may communicate through a wireless communications device currently contained within or otherwise carried along by the vehicle, such as a user equipment (UE) device (e.g., a smartphone or similar device) carried or worn by a driver, passenger, or other person on board the vehicle, among other possibilities. For simplicity, the term "vehicle" as used herein may include the wireless communications equipment which represents the vehicle and conducts its communications. Thus, for example, when the vehicle 105A is said to conduct wireless communications, it is understood that, more specifically, certain wireless communications equipment associated with and carried along by the vehicle 105A is performing the wireless communications.

The pedestrian UEs (PUEs) 103 may constitute various types of user equipment (UE) devices, e.g., portable devices capable of wireless communication, such as smartphones, smartwatches, and so forth, and may be associated with various types of users. Thus, the PUEs 103 are UEs, e.g., such as UE 106, and may be referred to as UEs and/or UE devices. Note that although referred to as PUEs (pedestrian UEs), the PUEs 103 may not necessarily be carried by persons who are actively walking near roads or streets. PUEs may refer to UEs participating in a V2X system that are carried by stationary persons, by persons walking or running, or by persons on vehicles that may not substantially bolster the devices' power capabilities, such as bicycles, scooters, or certain motor vehicles. Note also that not all UEs participating in a V2X system are necessarily PUEs.

The user devices may be capable of communicating using multiple wireless communication standards. For example, the PUE 103A may be configured to communicate using a wireless networking (e.g., Wi-Fi) and/or peer-to-peer wireless communication protocol (e.g., Bluetooth, Wi-Fi peer-to-peer, and so forth) in addition to at least one cellular communication protocol (e.g., GSM, UMTS, LTE, LTE-A, LTE-V, HSPA, 3GPP2 CDMA2000, 5G NR, and so forth). The PUE 103A may also and/or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, as desired. Other combinations of wireless communication standards (including more than two wireless communication standards) are also possible.

As shown, certain user devices may be able to conduct communications with one another directly, e.g., without an intermediary infrastructure device such as base station 102A or RSU 110A. As shown, vehicle 105A may conduct V2X-related communications directly with vehicle 105B. Similarly, the vehicle 105B may conduct V2X-related communications directly with PUE 103B. Such peer-to-peer communications may utilize a "sidelink" interface such as the PC5 interface in the case of some LTE and/or 5G NR embodiments. In some embodiments, the PC5 interface supports direct cellular communication between user devices (e.g., between vehicles 105), while the Uu interface supports cellular communications with infrastructure devices such as base stations. The PC5/Uu interfaces are used only as an example, and PC5 as used herein may represent various other possible wireless communications technologies that allow for direct sidelink communications between user devices, while Uu in turn may represent cellular communications conducted between user devices and infrastructure devices, such as base stations. Some user devices in a V2X system, e.g., PUE 103A, may be unable to perform sidelink communications, e.g., because they lack certain hardware necessary to perform such communications.

As shown, the example V2X system includes a number of infrastructure devices in addition to the above-mentioned user devices. As used herein, "infrastructure devices" in the context of V2X systems refers to certain devices in a V2X system which are not user devices and are not carried by traffic actors (e.g., pedestrians, vehicles, or other mobile users), but rather which facilitate user devices' participation in the V2X network. The infrastructure devices in the example V2X system include base station 102A and roadside unit (RSU) 110A.

The base station (BS) 102A may be a base transceiver station (BTS) or cell site (a "cellular base station"), and may include hardware that enables wireless communication with user devices, e.g., with the user devices 103A and 105A.

The communication area (or coverage area) of the base station may be referred to as a "cell" or "coverage". The base station 102A and user devices such as PUE 103A may be configured to communicate over the transmission medium using any of various radio access technologies (RATs), also referred to as wireless communication technologies, or telecommunication standards, such as GSM, UMTS, LTE, LTE-Advanced (LTE-A), LTE-Vehicle (LTE-V), HSPA, 3GPP2 CDMA2000, 5G NR, and so forth. Note that if the base station 102A is implemented in the context of LTE, it may alternately be referred to as an 'eNodeB', or eNB whereas if the base station 102A is implemented in the context of 5G NR, it may alternately be referred to as a 'gNodeB', or gNB.

As shown, the base station 102A may also be equipped to communicate with a network 100 (e.g., the V2X network, as well as a core network of a cellular service provider, a telecommunication network such as a public switched telephone network (PSTN), and/or the Internet, among various possibilities). Thus, the base station 102A may facilitate communication between user devices and/or between user devices and the network 100. The base station 102A may provide user devices, such as PUE 103A, with various telecommunication capabilities, such as voice, SMS and/or data services. In particular, the base station 102A may provide connected user devices, such as PUE 103A and vehicle 105A, with access to the V2X network.

Thus, while the base station 102A may act as a "serving cell" for user devices 103A and 105A as illustrated in FIG. 1, the user devices 103B and 105B may also be capable of communicating with the base station 102A. The user devices shown, e.g., user devices 103A, 103B, 105A, and 105B may also be capable of receiving signals from (and may possibly be within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are of course also possible.

Roadside unit (RSU) 110A constitutes another infrastructure device usable for providing certain user devices with access to the V2X network. RSU 110A may be one of various types of devices, such as a base station, e.g., a transceiver station (BTS) or cell site (a "cellular base station"), or another type of device that includes hardware that enables wireless communication with user devices and facilitates their participation in the V2X network.

RSU 110A may be configured to communicate using one or more wireless networking communication protocols (e.g., Wi-Fi), cellular communication protocols (e.g., LTE, LTE-V, 5G NR and so forth), and/or other wireless communication protocols. In some embodiments, RSU 110A may be able to communicate with devices using a "sidelink" technology such as PC5.

RSU 110A may communicate directly with user devices, such as the vehicles 106A and 106B as shown. RSU 110A may also communicate with the base station 102A. In some cases, RSU 110A may provide certain user devices, e.g., vehicle 106B, with access to the base station 102A. While RSU 110A is shown communicating with vehicles 106, it may also (or otherwise) be able to communicate with PUEs 104. Similarly, RSU 110A may not necessarily forward user device communications to the base station 102A. In some embodiments, the RSU 110A and may constitute a base station itself, and/or may forward communications to the server 120.

The server 120 constitutes a network entity of the V2X system, as shown, and may be referred to as a cloud server. Base station 102A and/or RSU 110A may relay certain V2X-related communications between the user devices 104 and 106 and the server 120. The server 120 may be used to process certain information collected from multiple user devices, and may administer V2X communications to the user devices in order to coordinate traffic activity. In various other embodiments of V2X systems, various functions of the cloud server 120 may be performed by an infrastructure device such as the base station 102A or RSU 110A, performed by one or more user devices, and/or not performed at all.

Figure 2:
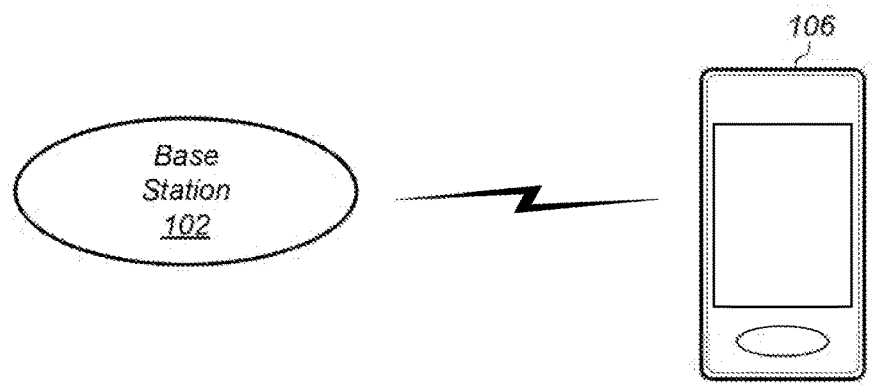
FIG. 2 illustrates a base station in communication with a user equipment (UE) device, according to some embodiments.

FIG. 2—Communication Between a UE and Base Station

FIG. 2 illustrates a user equipment (UE) device 106 (e.g., one of the PUEs 103A or 103B and/or vehicles 105A or 105B in FIG. 1) in communication with a base station 102 (e.g., the base station 102A in FIG. 1), according to some embodiments. The UE 106 may be a device with cellular communication capability such as a mobile phone, a handheld device, a computer or a tablet, or virtually any type of portable wireless device.

The UE 106 may include a processor that is configured to execute program instructions stored in memory. The UE 106 may perform any of the method embodiments described herein by executing such stored instructions. Alternatively, and/or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 104 may be configured to communicate using, for example, CDMA2000 (1×RTT/1×EV-DO/HRPD/eHRPD) LTE, and/or 5G NR using a single shared radio and/or 5G NR or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using any of 5G NR, LTE, and/or 1×RTT (or LTE or GSM), and separate radios for communicating using each of Wi-Fi and Bluetooth. Other configurations are also possible.

Figure 3:
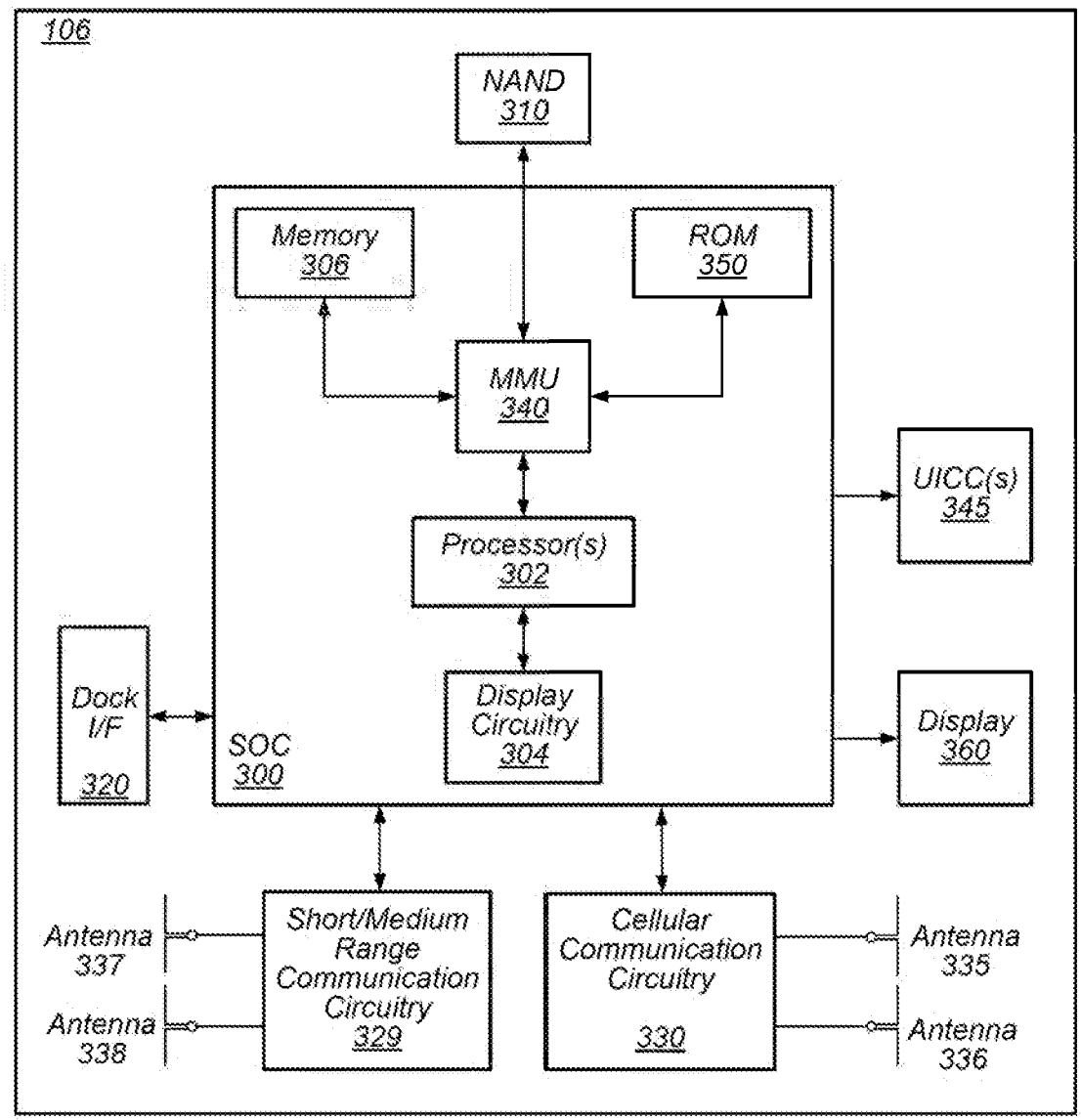
FIG. 3 illustrates an example block diagram of a UE according to some embodiments.

FIG. 3: Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device (e.g., such as PUEs 103 and/or vehicles 105), a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; and so forth), the display 360, which may be integrated with or external to the communication device 106, and cellular communication circuitry 330 such as for 5G NR, LTE, GSM, and so forth, and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. Note that the term "SIM" or "SIM entity" is intended to include any of various types of SIM implementations or SIM functionality, such as the one or more UICC(s) cards 345, one or more eUICCs, one or more eSIMs, either removable or embedded, and so forth. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 310 may be implemented as a removable smart card. Thus, the SIM(s) may be one or more removable smart cards (such as UICC cards, which are sometimes referred to as "SIM cards"), and/or the SIMS 310 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 310 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VOLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for utilization of an inter-UE coordination message, e.g., for V2X Mode 2 resource allocation, as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, and so forth) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, and so forth) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, and so forth) configured to perform the functions of short to medium range wireless communication circuitry 329.

Figure 4:
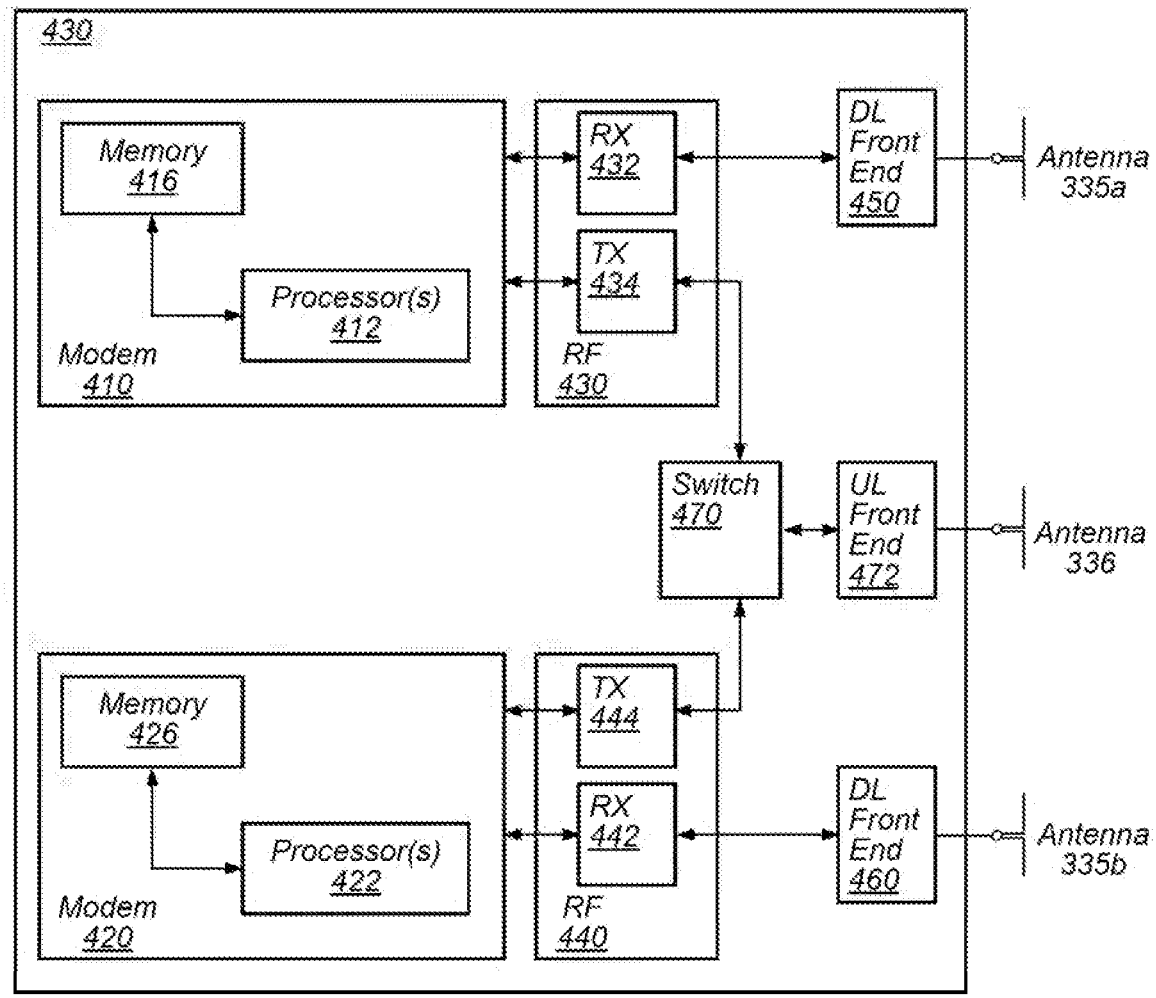
FIG. 4 illustrates an example block diagram of cellular communication circuitry, according to some embodiments.

FIG. 4: Block Diagram of Cellular Communication Circuitry

FIG. 4 illustrates an example simplified block diagram of cellular communication circuitry, according to some embodiments. It is noted that the block diagram of the cellular communication circuitry of FIG. 4 is only one example of a possible cellular communication circuit. According to embodiments, cellular communication circuitry 430, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 430 may couple (e.g., communicatively; directly or indirectly) to one or more antennas, such as antennas 435a-b and 436 as shown (in FIG. 4). In some embodiments, cellular communication circuitry 430 may include dedicated receive chains (including and/or coupled to, e.g., communicatively; directly or indirectly. dedicated processors and/or radios) for multiple RATs (e.g., a first receive chain for LTE and a second receive chain for 4G NR). For example, as shown in FIG. 4, cellular communication circuitry 430 may include a modem 410 and a modem 420. Modem 410 may be configured for communications according to a first RAT, e.g., such as LTE or LTE-A, and modem 420 may be configured for communications according to a second RAT, e.g., such as 4G NR.

As shown, modem 410 may include one or more processors 412 and a memory 416 in communication with processors 412. Modem 410 may be in communication with a radio frequency (RF) front end 430. RF front end 430 may include circuitry for transmitting and receiving radio signals. For example, RF front end 430 may include receive circuitry (RX) 432 and transmit circuitry (TX) 434. In some embodiments, receive circuitry 432 may be in communication with downlink (DL) front end 450, which may include circuitry for receiving radio signals via antenna 335a.

Similarly, modem 420 may include one or more processors 422 and a memory 426 in communication with processors 422. Modem 420 may be in communication with an RF front end 440. RF front end 440 may include circuitry for transmitting and receiving radio signals. For example, RF front end 440 may include receive circuitry 442 and transmit circuitry 444. In some embodiments, receive circuitry 442 may be in communication with DL front end 460, which may include circuitry for receiving radio signals via antenna 335b.

In some embodiments, a switch 470 may couple transmit circuitry 434 to uplink (UL) front end 472. In addition, switch 470 may couple transmit circuitry 444 to UL front end 472. UL front end 472 may include circuitry for transmitting radio signals via antenna 336. Thus, when cellular communication circuitry 430 receives instructions to transmit according to the first RAT (e.g., as supported via modem 410), switch 470 may be switched to a first state that allows modem 410 to transmit signals according to the first RAT (e.g., via a transmit chain that includes transmit circuitry 434 and UL front end 472). Similarly, when cellular communication circuitry 430 receives instructions to transmit according to the second RAT (e.g., as supported via modem 420), switch 470 may be switched to a second state that allows modem 420 to transmit signals according to the second RAT (e.g., via a transmit chain that includes transmit circuitry 444 and UL front end 472).

In some embodiments, the cellular communication circuitry 430 may be configured to perform methods utilization of an inter-UE coordination message, e.g., for V2X Mode 2 resource allocation, as further described herein.

As described herein, the modem 410 may include hardware and software components for implementing the above features or for time division multiplexing UL data for NSA NR operations, as well as the various other techniques described herein. The processors 412 may be configured to implement part or all of the features described herein, e.g., by executing program instructions stored on a memory medium (e.g., a non-transitory computer-readable memory medium). Alternatively (or in addition), processor 412 may be configured as a programmable hardware element, such as an FPGA (Field Programmable Gate Array), or as an ASIC (Application Specific Integrated Circuit). Alternatively (or in addition) the processor 412, in conjunction with one or more of the other components 430, 432, 434, 450, 470, 472, 335 and 336 may be configured to implement part or all of the features described herein.

In addition, as described herein, processors 412 may include one or more processing elements. Thus, processors 412 may include one or more integrated circuits (ICs) that are configured to perform the functions of processors 412. In addition, each integrated circuit may include circuitry (e.g., first circuitry, second circuitry, and so forth) configured to perform the functions of processors 412.

As described herein, the modem 420 may include hardware and software components for implementing the above features for communicating a scheduling profile for power savings to a network, as well as the various other techniques described herein. The processors 422 may be configured to implement part or all of the features described herein, e.g., by executing program instructions stored on a memory medium (e.g., a non-transitory computer-readable memory medium). Alternatively (or in addition), processor 422 may be configured as a programmable hardware element, such as an FPGA (Field Programmable Gate Array), or as an ASIC (Application Specific Integrated Circuit). Alternatively (or in addition) the processor 422, in conjunction with one or more of the other components 440, 442, 444, 450, 470, 472, 335 and 336 may be configured to implement part or all of the features described herein.

In addition, as described herein, processors 422 may include one or more processing elements. Thus, processors 422 may include one or more integrated circuits (ICs) that are configured to perform the functions of processors 422. In addition, each integrated circuit may include circuitry (e.g., first circuitry, second circuitry, and so forth) configured to perform the functions of processors 422.

Figure 5:
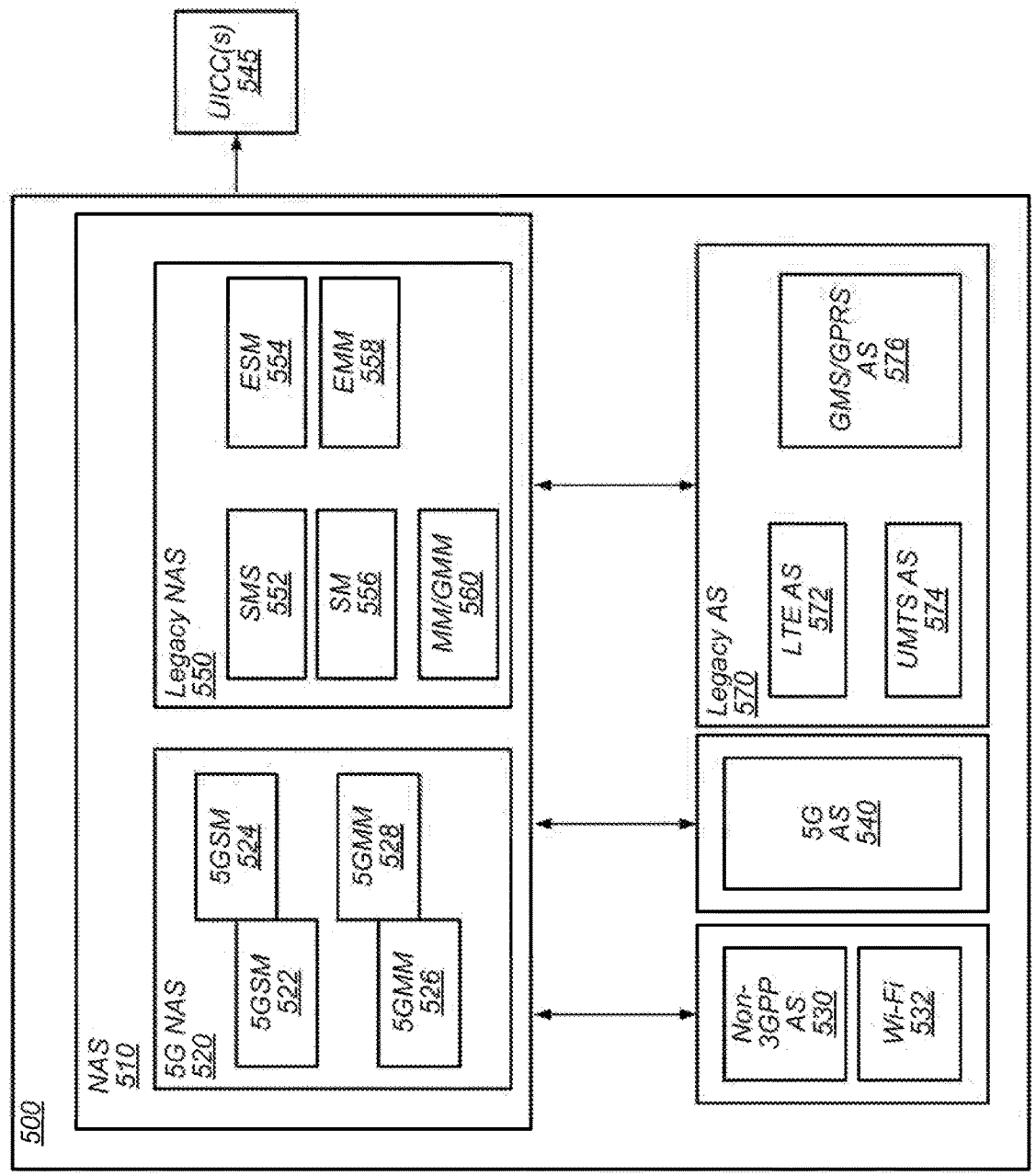
FIG. 5 illustrates an example of a baseband processor architecture for a UE, according to some embodiments.

FIG. 5: Baseband Processor Architecture

FIG. 5 illustrates an example of a baseband processor architecture for a UE (e.g., such as UE 106), according to some embodiments. The baseband processor architecture 500 described in FIG. 5 may be implemented on one or more radios (e.g., radios 429 and/or 430 described above) or modems (e.g., modems 510 and/or 520) as described above. As shown, the non-access stratum (NAS) 510 may include a 5G NAS 520 and a legacy NAS 550. The legacy NAS 550 may include a communication connection with a legacy access stratum (AS) 570. The 5G NAS 520 may include communication connections with both a 5G AS 540 and a non-3GPP AS 530 and Wi-Fi AS 532. The 5G NAS 520 may include functional entities associated with both access stratums. Thus, the 5G NAS 520 may include multiple 5G MM entities 526 and 528 and 5G session management (SM) entities 522 and 524. The legacy NAS 550 may include functional entities such as short message service (SMS) entity 552, evolved packet system (EPS) session management (ESM) entity 554, session management (SM) entity 556, EPS mobility management (EMM) entity 558, and mobility management (MM)/GPRS mobility management (GMM) entity 560. In addition, the legacy AS 570 may include functional entities such as LTE AS 572, UMTS AS 574, and/or GSM/GPRS AS 576.

Thus, the baseband processor architecture 500 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods utilization of an inter-UE coordination message, e.g., for V2X Mode 2 resource allocation, e.g., as further described herein.

Figure 6:
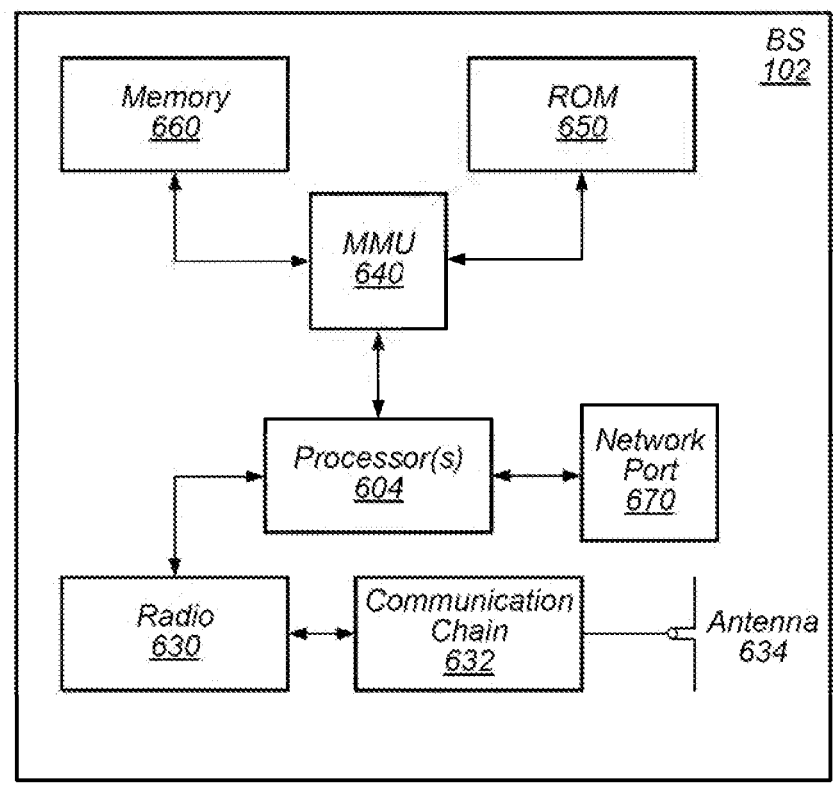
FIG. 6 illustrates an example block diagram of a base station, according to some embodiments.

FIG. 6: Block Diagram of a Base Station

FIG. 6 illustrates an example block diagram of a base station 102 (e.g., base station 102A in FIG. 1), according to some embodiments. It is noted that the base station of FIG. 6 is merely one example of a possible base station. As shown, the base station 102 may include processor(s) 604 which may execute program instructions for the base station 102. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The base station 102 may include at least one network port 670. The network port 670 may be configured to couple to a telephone network and provide a plurality of devices, such as UE devices 106.

The network port 670 (or an additional network port) may also or alternatively be configured to couple to a cellular network, e.g., a core network of a cellular service provider. The core network may provide mobility related services and/or other services to a plurality of devices, such as UE devices 106. In some cases, the network port 670 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 634, and possibly multiple antennas. The at least one antenna 634 may be configured to operate as a wireless transceiver and may be further configured to communicate with UE devices 106 via radio 630. The antenna 634 communicates with the radio 630 via communication chain 632. Communication chain 632 may be a receive chain, a transmit chain or both. The radio 630 may be configured to communicate via various wireless communication standards, including, but not limited to, 5G NR, LTE, LTE-A, GSM, UMTS, CDMA2000, Wi-Fi, and so forth.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another example, the base station 102 may include a 5G NR radio for performing communication according to 5G NR as well as a Wi-Fi radio for performing communication according to Wi-Fi. In such a case, the base station 102 may be capable of operating as both 5G NR base station and a Wi-Fi access point. As a further possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, and so forth).

As described further subsequently herein, the BS 102 may include hardware and software components for implementing or supporting implementation of features described herein. The processor 604 of the base station 102 may be configured to implement or support implementation of part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof. Alternatively (or in addition) the processor 604 of the BS 102, in conjunction with one or more of the other components 630, 632, 634, 640, 650, 660, 670 may be configured to implement or support implementation of part or all of the features described herein.

In addition, as described herein, processor(s) 604 may be comprised of one or more processing elements. In other words, one or more processing elements may be included in processor(s) 604. Thus, processor(s) 604 may include one or more integrated circuits (ICs) that are configured to perform the functions of processor(s) 604. In addition, each integrated circuit may include circuitry (e.g., first circuitry, second circuitry, and so forth) configured to perform the functions of processor(s) 604.

Further, as described herein, radio 630 may be comprised of one or more processing elements. In other words, one or more processing elements may be included in radio 630. Thus, radio 630 may include one or more integrated circuits (ICs) that are configured to perform the functions of radio 630. In addition, each integrated circuit may include circuitry (e.g., first circuitry, second circuitry, and so forth) configured to perform the functions of radio 630.

Sidelink Resource Management

In some existing implementations, a listen before talk (LBT) mechanism may be used to access shared medium (e.g., such as unlicensed bands commonly used for Wi-Fi, Bluetooth, and other short to medium range communications, e.g., non-3GGP access) to avoid collisions (e.g., of transmissions emanating from two or more wireless devices attempting to access the shared medium) and to improve medium utilization efficiency. However, LBT mechanisms are not collision free. In other words, LBT mechanisms cannot guarantee collision free transmissions.

For example, in the case of a unicast transmission, a transmitter may readily detect a transmission collision based on a receiver's acknowledgement/negative acknowledgement (ACK/NACK) feedback. However, in the case of a multicast (or group-cast) transmission, a transmitter may not easily detect a collision based on receivers' ACK/NACKs due, at least in part, to heavy traffic associated with ACK/NACKs from multiple receivers and to a transmitter's inability to distinguish between (or isolate) transmission collisions from channel quality issues based on received ACK/NACKs. In other words, since receivers in a multicast transmission may have different locations with differing channel quality, a reason for a NACK (e.g., transmission collision versus poor channel quality) cannot be determined by the transmitter. Additionally, in the case of a broadcast transmission, feedback from receivers is known to not be feasible, so in this scenario, a transmitter would not have knowledge of collisions. Further, in some implementations, a transmitter may reserve periodic slots within a reservation period for communication. In such implementations, if collisions occur, the collisions could persist for at least a portion of the reservation period (and in a worst-case scenario, the duration of the reservation period) if the transmitter does not detect (or is unable to detect) the collisions.

Figure 7:
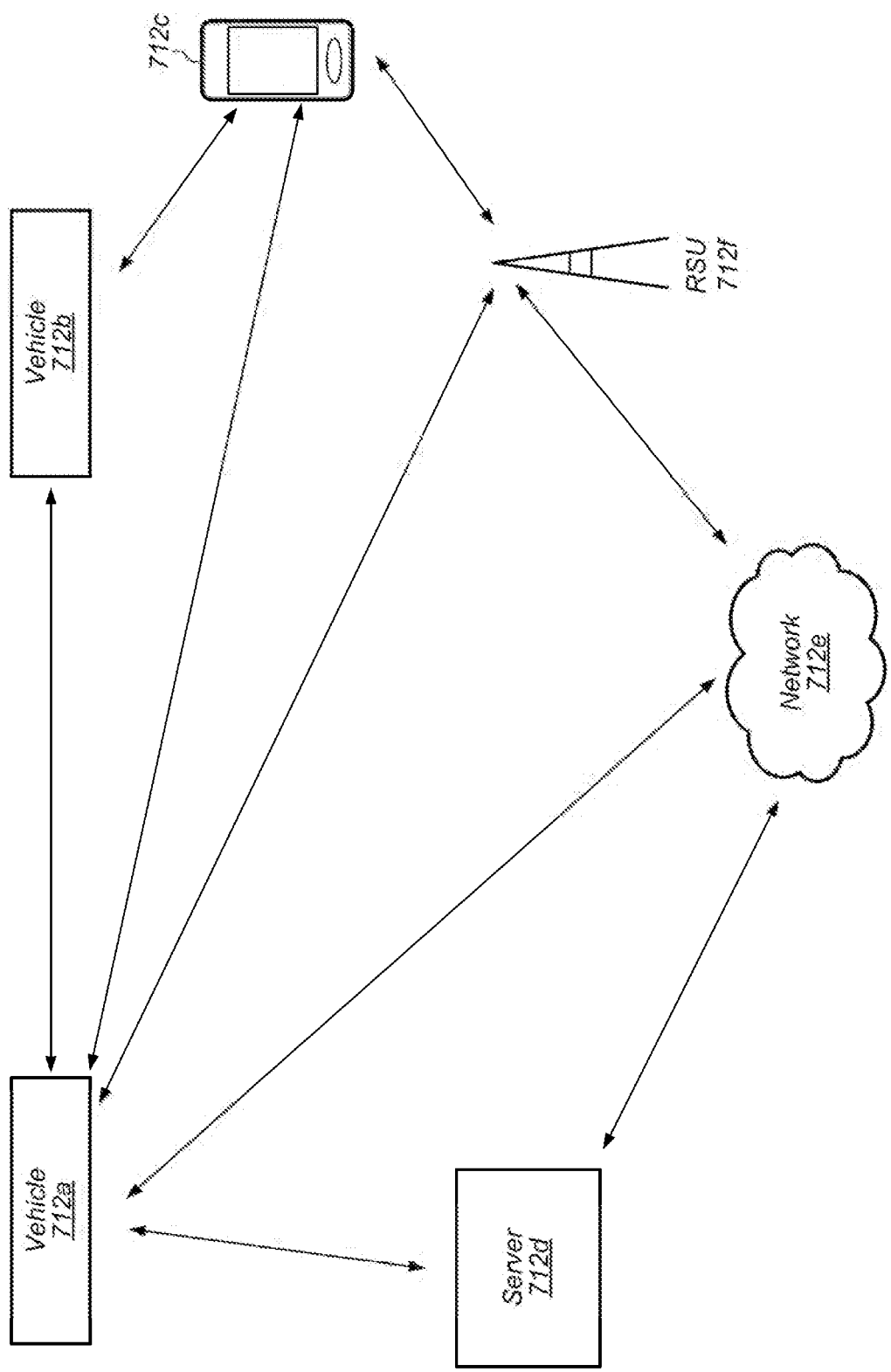
FIG. 7 illustrates an example of a vehicle-to-everything network.

As an example, vehicle-to-everything (V2X) communications, e.g., as specified by 3GPP TS 22.185 V.14.3.0 and beyond, allows for communication between a vehicle (e.g., a mobile unit within a vehicle, such as a wireless device comprised within or currently contained within a vehicle and/or another transmitter contained or comprised with a vehicle) and various wireless devices. For example, as illustrated by FIG. 7, a vehicle, such as vehicle 712*a*, may communicate with various devices (e.g., devices 712*b-f*), such as road side units (RSUs), infrastructure (V2I), network (V2N), pedestrian (V2P), and/or other vehicles (V2V). In addition, as shown, all devices within the V2X framework may communicate with other devices. V2X communications may utilize both long range (e.g., cellular) communications as well as short to medium range communications (e.g., non-cellular). In some contemplated implementations, the non-cellular communications may use unlicensed bands as well as a dedicated spectrum at 5.9 GHZ. Moreover, V2X communications may include unicast, multicast, groupcast, and/or broadcast communications. Each communication type may employ an LBT mechanism. Further, under the V2X communication protocol, a transmitter may reserve periodic slots within a reservation period. Thus, as described above, in various cases a transmitter utilizing V2X communications, may, in some instances, be unable to detect collisions after using an LBT mechanism.

In some existing implementations, 5G NR V2X may include various scheduling modes. For example, 5G NR V2X mode 2 may be designed for UE self-determination of sidelink transmission resources. 5G NR V2X mode 2 includes various sub-modes, including:
- Mode2(a) in which a user equipment device (UE) autonomously selects sidelink resources for transmission;
- Mode2(b) in which a UE assists sidelink resource selection for other UE(s);
- Mode2(c) in which a UE is configured with NR configured grants (e.g., network defined semi-persistent grants) for sidelink transmission; and
- Mode2(d) in which a UE schedules sidelink transmissions of other UEs.

In addition, due to the periodic nature of V2X messaging, existing implementations of V2X may support semi-persistent scheduling (SPS), e.g., configured grant(s). For example, semi-persistent resources in SPS may represent timely repeated resources across a set of discontinuous sub-frames with a certain repetition periodicity. Further, existing implementations of SPS (e.g., LTE V2X) and its corresponding resource allocation design are optimized for broadcast service. However, 5G NR V2X mode 2 additionally supports both unicast and groupcast services. Thus, there is a strong need to enhance methods that aid semi-persistent resource allocation for unicast service and groupcast service in 5G NR V2X mode 2.

Utilization of an Inter-UE Coordination Message

In current cellular communication systems, e.g., such as defined by NR V2X Release 16, for a Mode 2 resource allocation scheme, a transmitting wireless device may select sidelink transmission resources based on its own sensing and resource selection procedure, e.g., without input from the receiving wireless device. NR V2X Release 17 introduced that, for inter-UE coordination of Mode 2 resource allocations, a set of resources may be determined by a first wireless device (e.g., UE-A) and sent to a second wireless device (UE-B). The second wireless device may then take the set of resources into account in a resource selection for its own transmission.

In order to determine the set of resources, candidate resources are identified within a resource selection window. Note that a resource may be excluded if it is reserved and the associated RSRP measurement is above a threshold, where an initial RSRP threshold is pre-configured for each combination of a priority of data for transmission and a priority of data reserving the resource. Identification may be stopped when a number of identified candidate resources is more than X % of the number of all resources in the resource selection window in the resource pool. Note that X can be 20, 35, and/or 50 and can be pre-configured per resource pool per L1 priority. Note further that if a number of identified candidate resources is not more than X % of the number of all resources in the resource selection window in the resource pool upon completion of the identification process, the RSRP threshold (initial and/or current) may be increased by 3 dB and the identification procedure may be repeated. Once the resource set is identified, it may be transmitted to the second wireless device. The second wireless device may perform a randomized resource selection based on the resource set and ensure a minimum time gap between any two selected resources of a TB where HARQ feedback for the first of these resources is expected.

In particular, a total number of candidate single-slot resources within the resource selection window may be set as $M_{total}$. Additionally, a sensing window may be defined via sensing operations and an internal RSRP threshold for resource exclusion may set. Further, the set of all candidate single-slot resources may be initially set as SA and the first wireless device may exclude any candidate single-slot resource from SA due to slots not monitored and/or due to the resource reservation conflict (e.g., resource reserved by sidelink control information (SCI) and/or RSRP of the physical sidelink control channel (PSCCH) or the physical sidelink shared channel (PSSCH) associates with the reservation SCI is larger than the RSRP threshold). Then, if a number of candidate single-slot resource in SA is less than a product of X and $M_{total}$, increase the RSRP threshold by 3 dB and repeat the exclusion process. Otherwise, the SA without the excluded resources may be reported to higher layers.

However, the second wireless device's behavior after receiving the set of resources remains undefined. For example, behaviors left undefined include the second wireless device's resource selection procedure upon receiving the set of resources, second wireless device's resource reevaluation procedure upon receiving the set of resources, as well as the second wireless device's resource pre-emption check upon receiving the set of resources. Additionally, it has not been defined whether the second wireless device will have different behaviors depending on the contents of the set of resources.

Embodiments described herein provide systems, methods, and mechanisms for utilization of an inter-UE coordination message, e.g., for V2X Mode 2 resource allocation. In some embodiments, a UE, such as UE 106, may receive an inter-UE coordination message from a coordinating UE, where the inter-UE coordination message may indicate a set of resources for the UE. Upon receipt of the inter-UE coordination message, the UE's behavior may depend on a category of the coordinating UE. For example, if the coordinating UE is a helper UE, e.g., which sends the set of resources for the UE's reference, the UE may have flexibility in its resource selection procedure. As another example, if the coordinating UE is a controlling UE, the UE may be required to follow the set of resources indicated in the inter-UE coordination message. Additionally, upon receipt of the inter-UE coordination message, the UE's behavior may depend on contents of the inter-UE coordination message. For example, if and/or when the inter-UE coordination message includes assistance information (e.g., such as cause of not preferring certain resources) along with the set of resources, then UE may have flexibility in its resource selection procedure (e.g., the UE may not be restricted to following the recommended resources in the inter-UE coordination message). Further, upon receipt of the inter-UE coordination message, the UE's behavior may depend on a time of receipt of the inter-UE coordination message. For example, if and/or when the inter-UE coordination message is received within a configured time threshold before a planned sidelink transmission, then UE may not have enough time to process and apply the resources in the inter-UE coordination message. Hence, the UE may not perform resource re-evaluation and/or resource pre-emption operations.

Figure 8:
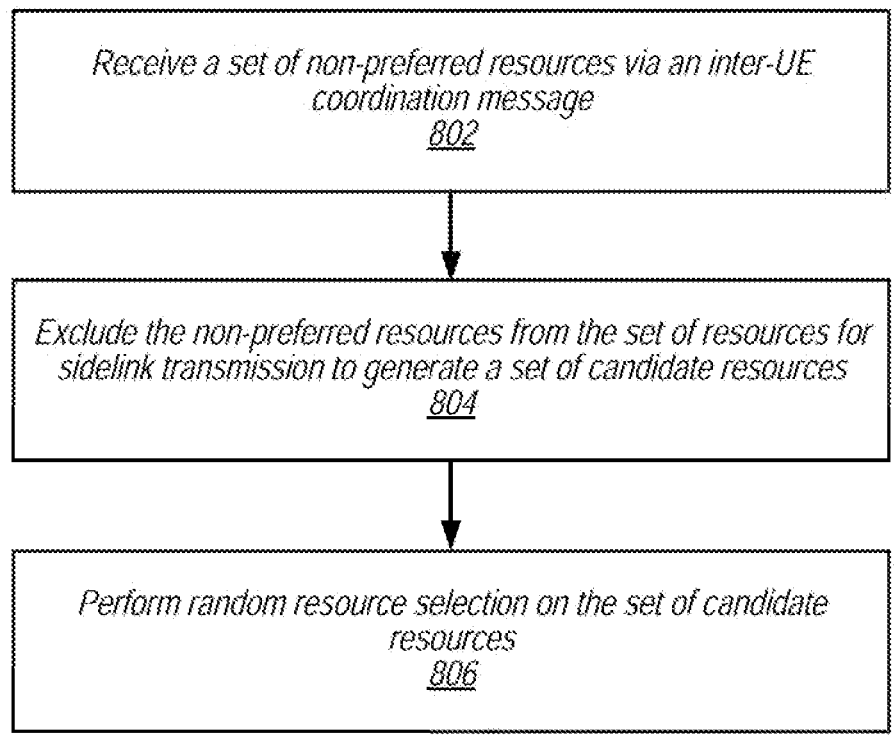
FIG. 8 illustrates a block diagram of an example of method for a UE to perform resource selection with non-preferred resources indicated in an inter-UE coordination message, according to some embodiments.
Figure 9:
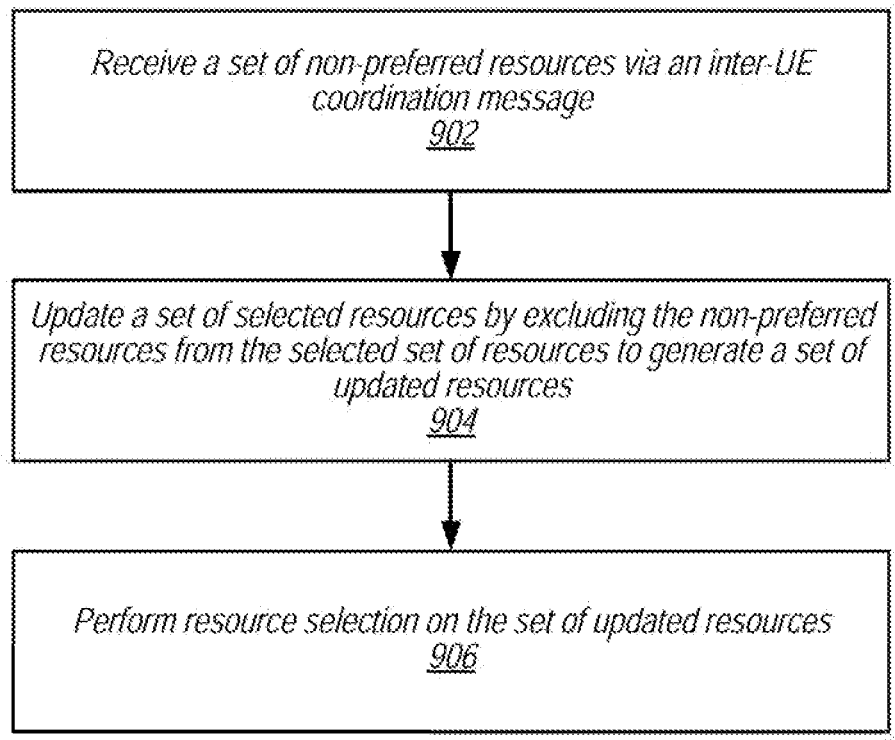
FIG. 9 illustrates a block diagram of an example of a method for a UE to perform resource re-evaluation with non-preferred resources indicated in an inter-UE coordination message, according to some embodiments.

In some embodiments, a UE, such as UE 106, may receive an inter-UE coordination message that includes an indication of non-preferred resources. Based on the indication of non-preferred resources, the UE may perform resource selection and/or resource reselection, e.g., via a re-evaluation procedure. For example, FIGS. 8 and 9 illustrate block diagrams of examples of such procedures, according to some embodiments. Note that the methods shown in FIGS. 8 and 9 may be used in conjunction with one another as well as with any of the systems, methods, or devices shown in the Figures, among other devices. Note that in the embodiments described herein, the inter-UE coordination message may be transmitted from a coordinating UE to the UE, where the coordinating UE determines a set of resources to indicate via the inter-UE coordination message. and where the set of resources are used by the UE for sidelink transmissions.

Turning to FIG. 8, illustrated is a block diagram of an example of method for a UE to perform resource selection with non-preferred resources indicated in an inter-UE coordination message, according to some embodiments. Note that the method shown in FIG. 8 may be used in conjunction with one another as well as with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 802, a UE, such as UE 106, may receive, from a coordinating UE, a set of non-preferred resources via an inter-UE coordination message. At this point, the UE may not have selected sidelink resources, thus the UE may apply the set of-non-preferred resources as part of a resource selection procedure. Thus, the UE may identify a set of resources within a resource selection window. Then, at 804, the UE may exclude the non-preferred resources from the set of resources for sidelink transmission to generate a set of candidate resources. For example, in some embodiments, a physical layer of the UE may identify the set of resources within the resource selection window (e.g., based on sensing) and pass the set of resources to a MAC layer of the UE. The MAC layer may then generate the set of candidate resources, e.g., via exclusion on the non-preferred resources. As another example, in some embodiments, the physical layer of the UE may identify the set of resources within the resource selection window (e.g., based on sensing) and receive the non-preferred resources from the MAC layer of the UE which are indicated in the inter-UE coordination message. The physical layer may then generate the set of candidate resources, e.g., via exclusion on the non-preferred resources and pass the candidate resources to the MAC layer. Note that, depending on a category of the first UE and/or assistance information (e.g., such as RSRP for the set of resources and/or data priority of the set of resources), not all resources from the non-preferred resources may be excluded from the set of resources. For example, the UE may determine that based on the category of the first UE, that it is not required to follow all of the first UE's suggested resource selections. As another example, based on the assistance information, the UE may determine that a non-preferred resource may be preferable to the UE, e.g., based on RSRP sensed by the UE. At 806, the UE may perform a random resource selection procedure on the set of candidate resources, e.g., to determine a set of resources to use for sidelink communications. In at least some instances, the MAC layer may perform the random resource selection procedure.

Turning to FIG. 9, illustrated is a block diagram of an example of a method for a UE to perform resource reselection with non-preferred resources indicated in an inter-UE coordination message, according to some embodiments. As noted, the method shown in FIG. 9 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 902, a UE, such as UE 106, may receive, from a coordinating UE, a set of non-preferred resources via an inter-UE coordination message. The UE may have previously selected a set of resources, e.g., based on a prior and/or previous set of resources indicated via a previous and/or prior inter-UE coordination message. Note that in some embodiments, the UE may have not yet reserved the selected resources prior to receipt of the inter-UE coordination message. In some embodiments, the UE may have reserved the selected resources prior to receipt of the inter-UE coordination message. The inter-UE coordination message may include assistance information.

At 904, the UE may update a set of selected resources based on the inter-UE coordination message and whether the UE has already reserved the selected resources. For example, if the UE has not reserved the selected resources, the UE may exclude the non-preferred resources from the selected set of resources to generate a set of updated resources. In other words, the UE may update the selected resources by excluding intersections between the selected set of resources and the set of non-preferred resources. Note that if after, exclusion the updated set of resources is a strict subset of selected set of resources, then the UE may trigger a resource selection procedure at 906. Note further, that if assistance information is included in the inter-UE coordination message, the UE may take the assistance information into account during the exclusion process, e.g., as described above. As another example, if the UE has reserved the selected resources (e.g., via SCI signaling), the UE may pass the selected and reserved resources to the physical layer as well as the set of non-preferred resources. Then, the physical layer may perform a pre-emption check on the selected resources at 906, wherein the set of non-preferred resources may be treated as reserved resources by other UEs, with RSRP level and data priority in an associated SCI being provided via the inter-UE coordination message.

At 906, the UE may perform a resource selection procedure on the set of updated resources, e.g., to determine a set of resources to use for sidelink communications.

Figure 10:
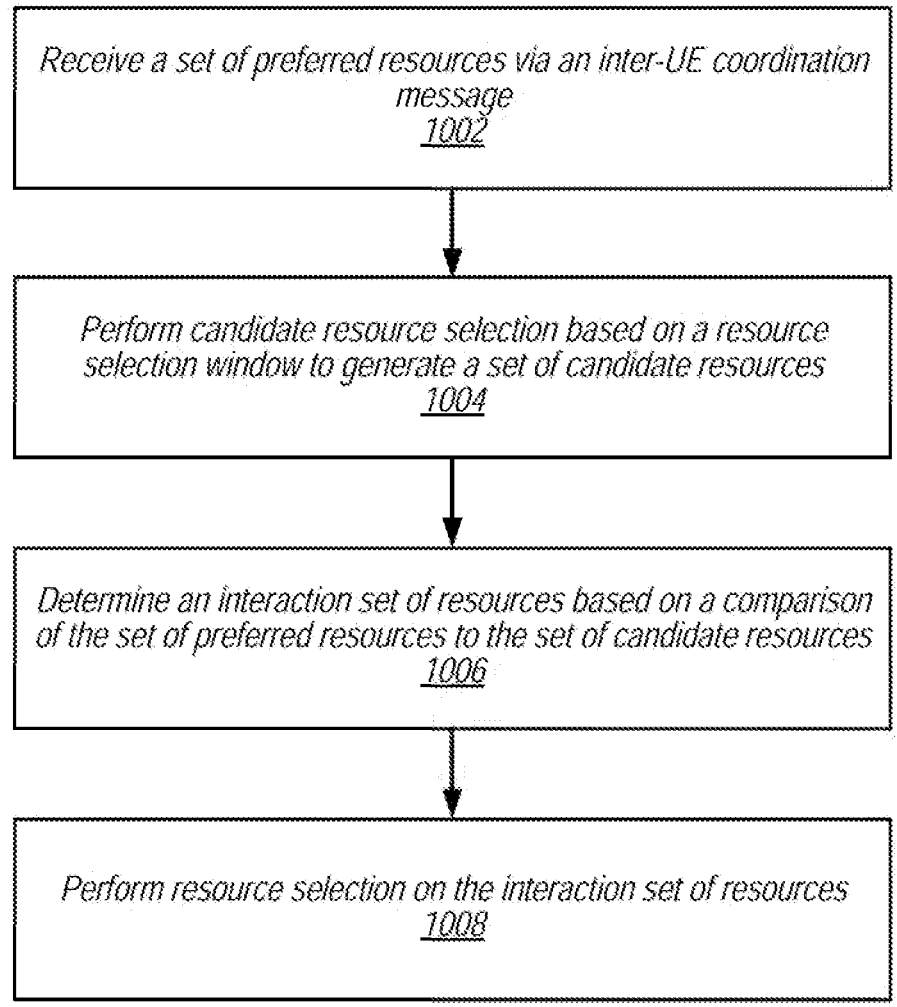
FIG. 10 illustrates a block diagram of an example of method for a UE to perform resource selection with preferred resources indicated in an inter-UE coordination message, according to some embodiments.
Figure 11:
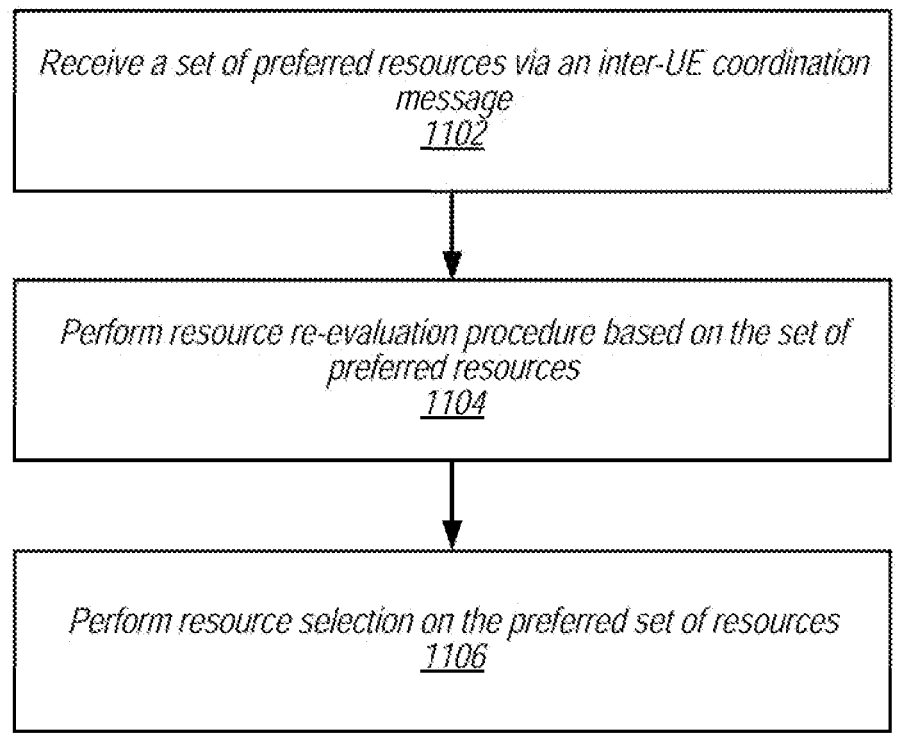
FIG. 11 illustrates a block diagram of an example of a method for a UE to perform resource re-evaluation with preferred resources indicated in an inter-UE coordination message, according to some embodiments.

In some embodiments, a UE, such as UE 106, may receive an inter-UE coordination message that includes an indication of preferred resources. Based on the indication of preferred resources, the UE may perform resource selection and/or resource reselection, e.g., via a re-evaluation procedure. For example, FIGS. 10 and 11 illustrate block diagrams of examples of such procedures, according to some embodiments. Note that the methods shown in FIGS. 10 and 11 may be used in conjunction with one another as well as with any of the systems, methods, or devices shown in the Figures, among other devices. Note that in the embodiments described herein, the inter-UE coordination message may be transmitted from a coordinating UE to the UE, where the coordinating UE determines a set of resources to indicate via the inter-UE coordination message. and where the set of resources are used by the UE for sidelink transmissions.

Turning to FIG. 10, illustrated is a block diagram of an example of method for a UE to perform resource selection with preferred resources indicated in an inter-UE coordination message, according to some embodiments. Note that the method shown in FIG. 10 may be used in conjunction with one another as well as with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1002, a UE, such as UE 106, may receive, from a coordinating UE, a set of preferred resources via an inter-UE coordination message. At this point, the UE may not have selected sidelink resources, thus the UE may apply the set of-non-preferred resources as part of a resource selection procedure. Thus, the UE may identify a set of resources within a resource selection window at 1004. Thus, the UE may perform a candidate resource selection procedure based on a resource selection window to generate a set of candidate resources. In some embodiments, a physical layer of the UE may perform the resource selection procedure, e.g., based on sensing (measurement) of resources at the UE. Then, at 1006, the UE may determine an interaction set of resources based on a comparison of the set of preferred resources to the set of candidate resources. In some embodiments, the physical layer may pass the set of candidate resources to a MAC layer of the UE and the MAC layer may determine the interaction set.

At 1008, the UE may perform a resource selection procedure on the interaction set of resources, e.g., to determine a set of resources to use for sidelink communications. In some embodiments, if a cardinality of the interaction set of resources is equal to a number of resources to be selected, then the determined set of resources may be the interaction set of resources. Alternatively, if the cardinality of the interaction set of resources is less than the number of resources to be selected, then besides the intersection set of resources, additional resources, up to the number of resources to be selected, may be randomly selected from the set of candidate resources excluding the interaction set of resources. Further, if the cardinality of the interaction of resources is greater than the number of resources to be selected, then the determined set of resources may be randomly selected from the interaction set of resources. Alternatively, if assistance information included in the inter-UE coordination message includes ranking of the set of preferred resources, then the determined set of resources may be selected in order of ranking, with higher ranked resources selected prior to lower ranked resources.

Turning to FIG. 11, illustrated is a block diagram of an example of a method for a UE to perform resource re-evaluation with preferred resources indicated in an inter-UE coordination message, according to some embodiments. As noted, the method shown in FIG. 11 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1102, a UE, such as UE 106, may receive, from a coordinating UE, a set of preferred resources via an inter-UE coordination message. The UE may have previously selected a set of resources, e.g., based on a prior and/or previous set of resources indicated via a previous and/or prior inter-UE coordination message. Note that in some embodiments, the UE may have not yet reserved the selected resources prior to receipt of the inter-UE coordination message. In some embodiments, the UE may have reserved the selected resources prior to receipt of the inter-UE coordination message. The inter-UE coordination message may include assistance information.

At 1104, the UE may perform a resource re-evaluation and/or re-selection procedure based on the set of preferred resources. For example, the UE may treat the preferred set of resources as selected resources which need re-evaluation.

At 1106, the UE may select a desired number of resources from the preferred resource set. In some embodiments, the UE may rank the set of preferred resources based on sensing, e.g., as performed by the UE. The UE may then select the desired number of highest ranked preferred resources, e.g., to determine a set of resources to use for sidelink communications. Alternatively, the UE may randomly select the desired number of resources from the preferred resource set.

Figure 12:
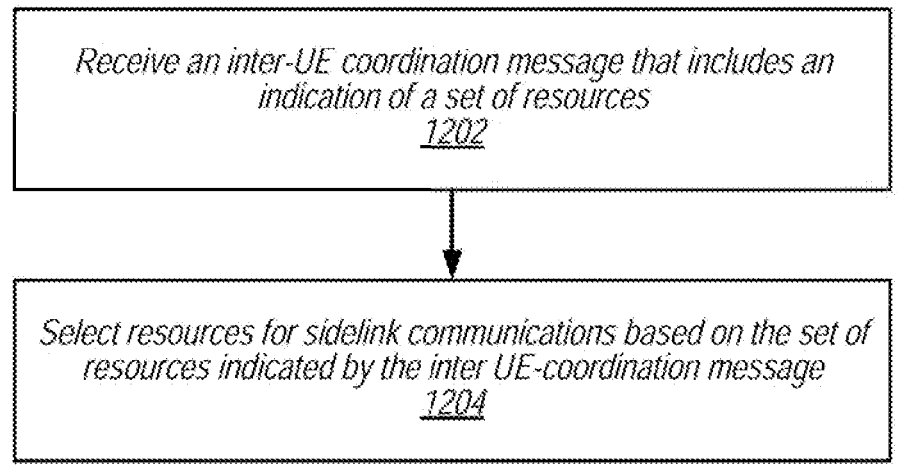
FIG. 12 illustrates a block diagram of an example of a method for utilization of an inter-UE coordination message, according to some embodiments.

FIG. 12 illustrates a block diagram of an example of a method for utilization of an inter-UE coordination message, according to some embodiments. The method shown in FIG. 12 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1202, a UE, such as UE 106, may receive, from a first UE, an inter-UE coordination message. The inter-UE coordination message may include an indication of a set of resources and an indication of whether the set of resources are preferred resources or non-preferred resources.

At 1204, the UE may select resources for sidelink communications based on the set of resources indicated in the inter-UE coordination message. In other words, the UE may perform differing selection processes based on the set of resources indicated in the inter-UE coordination message. Thus, for example, the UE may perform a first process and/or set of processes when the set of resources are indicated as non-preferred and a second process and/or sect of processes when the set of resources are indicated as preferred, e.g., as further described herein.

In some embodiments, the UE may determine resources available for sidelink communication and, when the set of resources are indicated as non-preferred (e.g., via the inter-UE coordination message), exclude at least a portion of the set of resources from the determined resources available for sidelink communication to generate a candidate resource set. In some embodiments, selecting resources for sidelink communications may include randomly selecting resources from the candidate resource set. In some embodiments, a physical layer of the UE may determine the resources available for sidelink communication and may pass the resources available for sidelink communication to a medium access control (MAC) layer of the UE. The MAC layer of the UE may generate the candidate resource set and may perform selection of the resources for sidelink communications. In some embodiments, the physical layer of the UE may determine the resources available for sidelink communication and may receive the set of resources from the MAC layer of the UE. The physical layer of the UE may generate the candidate resource set and may pass the candidate resource set to the MAC layer. The MAC layer may perform selection of the resources for sidelink communications.

In some embodiments, the UE may determine resources available for sidelink communication and, when the set of resources are indicated as preferred (e.g., via the inter-UE coordination message), determine an interaction set of resources based on a comparison of the resources available for sidelink communication and the set of resources. In some embodiments, selecting resources for sidelink communications may include randomly selecting resources from the interaction set of resources. Additionally, when a number of resources to be selected is less than the number of resources in the interaction set of resources and the inter-UE coordination message includes an indication of a ranking of resources within the set of resources, selecting resources for sidelink communication may include selecting resources from the interaction set of resources based on indicated rank of resources within the set of resources. The resources may be selected from highest rank in decreasing order up to the number of resources to be selected. In some embodiments, a physical layer of the UE may determine the resources available for sidelink communication and may pass the resources available for sidelink communication to the MAC layer of the UE. The MAC layer of the UE may generate the interaction set and may perform selection of the resources for sidelink communications.

In some embodiments, the UE may receive, from the first UE prior to reserving the selected sidelink resources, a second inter-UE coordination message. The second inter-UE coordination message may include an indication of a second set of resources and an indication that the second set of resources are non-preferred resources. The UE may exclude, based on a comparison of the selected sidelink resources and the second set of resources, resources in the selected sidelink resources indicated as non-preferred by the second set of resources. In some embodiments, when the second set of resources is a strict subset of the selected resources, the UE may randomly select resources from the excluded resources up to a number of resources required for selection. In some embodiments, when the second set of resources is a strict subset of the selected resources and assistance information is provided by the first UE, the UE may select resources from the excluded resources up to a number of resources required for selection based, at least in part, on the assistance information. The assistance information may include at least a reference signal received power (RSRP) for each resource in the second set of resources.

In some embodiments, the UE may receive, from the first UE after reserving the selected sidelink resources, a second inter-UE coordination message. The second inter-UE coordination message may include an indication of a second set of resources and an indication that the second set of resources are non-preferred resources. The UE may exclude, based on a comparison of the selected sidelink resources and the second set of resources, resources in the selected sidelink resources indicated as non-preferred by the second set of resources. In some embodiments, the second inter-UE coordination message may further include assistance information for the second set of resources.

In some embodiments, the UE may receive, from the first UE after selecting the sidelink resources, a second inter-UE coordination message. The second inter-UE coordination message may include an indication of a second set of resources and an indication that the second set of resources are preferred resources. The UE may select resources in the second set of resources based on interference level. The resources may be selected up to a number of required resources in order of decreasing rank. The UE may reserve the resources selected from the second set.

In some embodiments, the UE may receive, from the first UE after selecting the sidelink resources, a second inter-UE coordination message. The second inter-UE coordination message may include an indication of a second set of resources and an indication that the second set of resources are preferred resources. The UE may randomly select resources from the second set of resources up to a number of required resources. The UE may reserve the resources selected from the second set.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
at least one antenna;
at least one radio, wherein the at least one radio is configured to perform wireless communication using at least one radio access technology (RAT);
one or more processors coupled to the at least one radio, wherein the one or more processors and the at least one radio are configured to perform voice and/or data communications; and
wherein the one or more processors are configured to cause the UE to perform operations comprising:
receiving, from a first UE, a first inter-UE coordination message, wherein the first inter-UE coordination message includes an indication of a set of resources and an indication of whether the first set of resources are preferred resources or non-preferred resources;

selecting resources for sidelink communications based on the set of resources indicated in the first inter-UE coordination message;

receiving, from the first UE prior to reserving the selected sidelink resources, a second inter-UE coordination message, wherein the second inter-UE coordination message includes an indication of a second set of resources and an indication that the second set of resources are non-preferred resources; and excluding, based on a comparison of the selected sidelink resources and the second set of resources, resources in the selected sidelink resources indicated as non-preferred by the second set of resources.

2. The UE of claim 1,
wherein the one or more processors are further configured to cause the UE to:
determine resources available for sidelink communication; and
when the first set of resources are indicated as non-preferred, exclude at least a portion of the first set of resources from the determined resources available for sidelink communication to generate a candidate resource set.

3. The UE of claim 2,
wherein, to select resources for sidelink communications, the one or more processors are further configured to cause the UE to randomly select resources from the candidate resource set.

4. The UE of claim 2,
wherein a physical layer of the UE determines the resources available for sidelink communication and passes the resources available for sidelink communication to a medium access control (MAC) layer of the UE; and wherein the MAC layer of the UE generates the candidate resource set and performs selection of the resources for sidelink communications.

5. The UE of claim 2,
wherein a physical layer of the UE determines the resources available for sidelink communication and receives the set of resources from a medium access control (MAC) layer of the UE; wherein the physical layer of the UE generates the candidate resource set and passed the candidate resource set to the MAC layer, and wherein the MAC layer performs selection of the resources for sidelink communications.

6. The UE of claim 1,
wherein the one or more processors are further configured to cause the UE to:
determine resources available for sidelink communication; and
when the first set of resources are indicated as preferred, determine an interaction set of resources based on a comparison of the resources available for sidelink communication and the set of resources.

7. The UE of claim 6,
wherein, to select resources for sidelink communications, the one or more processors are further configured to cause the UE to randomly select resources from the interaction set of resources.

8. The UE of claim 6,
wherein, when a number of resources to be selected is less than the number of resources in the interaction set of resources and the first inter-UE coordination message includes an indication of a ranking of resources within the first set of resources, to select resources for sidelink communication, the one or more processors are further configured to cause the UE to select resources from the interaction set of resources based on indicated rank of resources within the first set of resources, wherein the resources are selected from highest rank in decreasing order up to the number of resources to be selected.

9. The UE of claim 6,
wherein a physical layer of the UE determines the resources available for sidelink communication and passes the resources available for sidelink communication to a medium access control (MAC) layer of the UE, and wherein the MAC layer of the UE generates the interaction set and performs selection of the resources for sidelink communications.

10. An apparatus, comprising:
a memory; and
at least one processor in communication with the memory, wherein the at least one processor is configured to:
receive, from a first user-equipment device (UE), a first inter-UE coordination message, wherein the first inter-UE coordination message includes an indication of a first set of resources and an indication of whether the first set of resources are preferred resources or non-preferred resources;
select resources for sidelink communications based on the set of resources indicated in the first inter-UE coordination message;
receive, from the first UE prior to reserving the selected sidelink resources, a second inter-UE coordination message, wherein the second inter-UE coordination message includes an indication of a second set of resources and an indication that the second set of resources are non-preferred resources; and
exclude, based on a comparison of the selected sidelink resources and the second set of resources, resources in the selected sidelink resources indicated as non-preferred by the second set of resources.

11. The apparatus of claim 10,
wherein, when the second set of resources is a strict subset of the selected resources, the at least one processor is further configured to randomly select resources from the excluded resources up to a number of resources required for selection.

12. The apparatus of claim 10,
wherein, when the second set of resources is a strict subset of the selected resources and assistance information is provided by the first UE, the at least one processor is further configured to select resources from the excluded resources up to a number of resources required for selection based, at least in part, on the assistance information; and
wherein the assistance information includes at least a reference signal received power (RSRP) for each resource in the second set of resources.

13. The apparatus of claim 10,
wherein the at least one processor is further configured to:
receive, from the first UE after reserving the selected sidelink resources, a third inter-UE coordination message, wherein the third inter-UE coordination message includes an indication of a third set of resources and an indication that the third set of resources are non-preferred resources; and
exclude, based on a comparison of the selected sidelink resources and the third set of resources, resources in the selected sidelink resources indicated as non-preferred by the third set of resources.

14. The apparatus of claim 13,
wherein the third inter-UE coordination message further includes assistance information for the third set of resources.

15. A non-transitory computer readable memory medium storing program instructions executable by processing circuitry to cause a user equipment device (UE) to:
receive, from a first UE, a first inter-UE coordination message, wherein the first inter-UE coordination message includes an indication of a first set of resources and an indication and an indication of preferred resources or an indication of non-preferred resources;
select resources for sidelink communications based on the first set of resources indicated in the first inter-UE coordination message;
receive, from the first UE prior to reserving the selected sidelink resources, a second inter-UE coordination message, wherein the second inter-UE coordination message includes an indication of a second set of resources and an indication that the second set of resources are non-preferred resources; and
exclude, based on a comparison of the selected sidelink resources and the second set of resources, resources in the selected sidelink resources indicated as non-preferred by the second set of resources.

16. The non-transitory memory medium of claim 15,
wherein the program instructions are further executable to:
receive, from the first UE after selecting the sidelink resources, a third inter-UE coordination message, wherein the third inter-UE coordination message includes an indication of third preferred resources; and
select resources in the third preferred resources based on interference level, wherein resources are selected up to a number of required resources in order of decreasing rank; and
reserve the resources selected from the third preferred resources.

17. The non-transitory memory medium of claim 15,
wherein the program instructions are further executable to:
receive, from the first UE after selecting the sidelink resources, a third inter-UE coordination message, wherein the third inter-UE coordination message includes an indication of third preferred resources; and
randomly select resources from the third preferred resources up to a number of required resources; and
reserve the resources selected from the third preferred resources.

18. The non-transitory memory medium of claim 15,
wherein the program instructions are further executable to:
receive, from the first UE after reserving the selected sidelink resources, a third inter-UE coordination message, wherein the third inter-UE coordination message includes an indication of third non-preferred resources; and
exclude, based on a comparison of the selected sidelink resources and the third non-preferred resources, resources in the selected sidelink resources indicated as non-preferred by the third non-preferred resources.

19. The non-transitory memory medium of claim 15,
wherein the non-preferred resources are treated as reserved resources by other UEs.

20. The UE of claim 1,
wherein the non-preferred resources are treated as reserved resources by other UEs.

* * * * *